Figure 1:
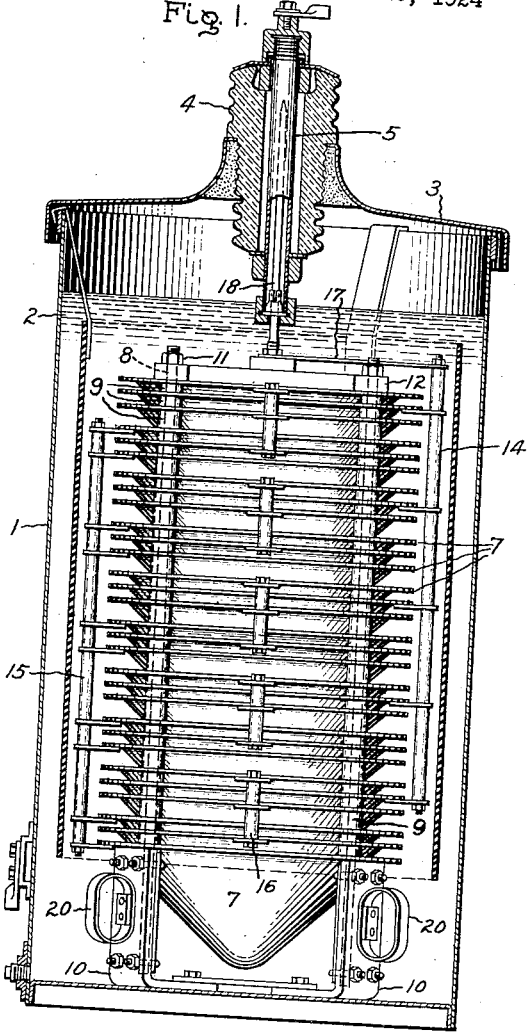

June 19, 1928.

H. G. BRINTON 1,674,497

ELECTROLYTIC CELL

Original Filed Nov. 10, 1924

Inventor
Howard G. Brinton
by
His Attorney

Patented June 19, 1928.

1,674,497

UNITED STATES PATENT OFFICE.

HOWARD G. BRINTON, OF PITTSFIELD, MASSACHUSETTS, ASSIGNOR TO GENERAL ELECTRIC COMPANY, A CORPORATION OF NEW YORK.

ELECTROLYTIC CELL.

Application filed November 10, 1924, Serial No. 748,805. Renewed June 3, 1926.

My invention relates to electrolytic cells, particularly those which are adapted for use as surge absorbers on direct current circuits. An object of my invention is to provide an improved construction for cells of this type which shall be efficient and rugged, shall have long life and shall be operable for long periods without attention.

One of the principal factors which has greatly reduced the useful life of such devices has been the pitting of the positive electrode. This pitting is greatest at or near the surface line of the electrolyte but occurs to some extent at all parts of the active surface of the electrode. Pitting is especially rapid where the service conditions are severe as in the case of surge absorbers. The object of my invention is accomplished by so arranging the electrodes and connections that the damage resulting from the pitting of the positive electrode is done away with or greatly reduced without increasing the number of electrodes or the size of the device.

Devices of this nature have previously been made using the cone type of construction such as used in electrolytic lightning arresters. The maximum safe voltage for one cell is such that it is usually necessary to connect two or more cells in series. For example, a series connection of two cells has been obtained by using a group of three cone-type electrodes in a stack with electrolyte between the top electrode and the middle electrode, and between the middle electrode and the bottom electrode. A number of these groups have been connected in parallel to obtain the desired current-carrying capacity. In this arrangement the middle electrode of a group is common to two cells, being the negative electrode of one cell and the positive electrode of the other cell. The insulating films on the positive electrodes serve at normal voltage as high resistance gaps in the otherwise low resistance path between the terminals of the device. With the arrangement just described the holes through the middle electrode caused by the pitting action allow the two bodies of electrolyte to come into direct contact thus throwing double normal voltage on the other film which then punctures resulting in a short-circuit. Holes pitted in the other positive electrode allow electrolyte to escape from the cell and may result in a short circuit to an adjacent group.

In accordance with my invention a group of three electrodes, cones in the present case, is so arranged and connected that the two cells are in parallel with the middle cone positive and the other two cones negative and connected together. Two or more groups may be connected in series as required by the circuit voltage and a number may be connected in parallel to obtain the desired current-carrying capacity. With this arrangement both positive films of a group are on the middle cone. The other two cones and the two bodies of electrolyte are at the same potential. Therefore any pitting of the middle cone, allowing the two bodies of electrolyte to come into direct contact, does not change the electrical conditions. Pitting through the middle cone will allow some escape of electrolyte from the upper to the lower cell until a common level is established. However the original electrolyte levels differ by only a small amount. There will be slight increase in electrolyte and active positive surface in the lower cell and a corresponding decrease in the upper cell with practically no change in the total active positive surface of the combination. As a matter of fact the middle cone can be made with perforations if desired. The change in level due to pitting through the middle cone is of some advantage as it changes the surface lines at which the pitting and other deterioration is most rapid.

My invention will be better understood from the following description taken in connection with the accompanying drawing, and its scope will be pointed out in the appended claims.

Figure 2:
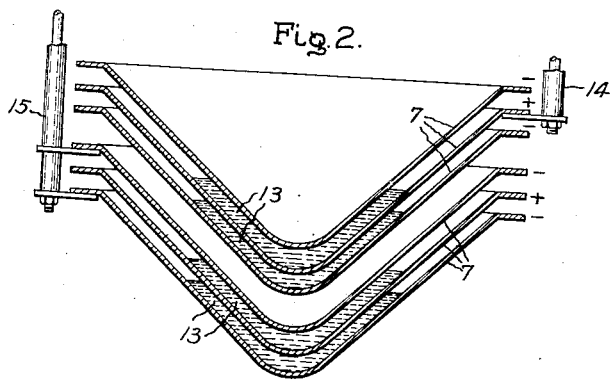

Fig. 1 of the drawing is a vertical sectional view of one embodiment of my invention and Fig. 2 is a detail drawn to a larger scale of the two lower groups of cones.

Referring now to the drawing the tank 1 containing a suitable insulating oil 2 has the cover 3 in which is mounted the insulator bushing 4 supporting the terminal rod 5. Immersed in the oil in the tank and supported on the bottom thereof is shown a stack of thirty cones 7, which may be of aluminum, arranged in ten groups of three each. The cones are supported in proper space relationship by means of rods 8 and spacers 9 which may be of any suitable insulating material such for example as wood and fiber respectively. The lowermost cone 7 rests upon angle brackets 10 to which the rods 8 are secured. By means of the nuts 11 on the rods 8 and the cross frame 12 the stack of cones 7 is firmly clamped to the angle brackets 10. Each group of cones 7 comprises two outer negative cones and an intermediate positive cone. The positive cone has a film formed on both sides thereof. The positive and the lower negative cones are partially filled with a suitable electrolyte 13 so that with the two negative cones electrically connected together each group comprises two cells connected in parallel. Electrical connections with the cones are made by means of the positive bus 14, the negative bus 15 and the intermediate connectors 16. The upper end of the positive bus connects by a conducting strip 17 with a spear 18 which is adapted to make contact with the positive terminal rod 5 when the cover 3 is in place. Negative connection is made with the tank through the angle brackets 10 and springs 20.

As clearly shown in Fig. 1, the first two groups of the stack are connected in series between the positive and negative busses, the third and fourth groups similarly form a second series circuit between the busses, the fifth and sixth form a third series circuit and so on throughout the stack. The positive cones are the only ones which are subject to deterioration which usually takes the form of pitting, resulting in the formation of small holes usually at or near the level of the electrolyte. When such holes occur the usefulness of the cells is not impaired, since it results only in allowing a small quantity of the electrolyte in the upper cell to pass in the lower cell until a common level is reached, thus increasing the active surface of the lower cell and decreasing the active surface of the upper cell. The slight loss in active surface of the positive cone due to the pitting is negligible.

It will be obvious that the several groups may be connected together in various other ways than that illustrated to suit the particular uses to which the apparatus is to be put.

What I claim as new and desire to secure by Letters Patent of the United States, is,—

1. An electrolytic protective device comprising a positive cone, negative cones, one arranged on each side of and spaced from said positive cone, the cones being adapted to contain an electrolyte and means connecting together the negative cones.

2. An electrolytic protective device comprising groups of cones, each group consisting of a positive cone and negative cones spaced on each side thereof, electrolyte in the spaces between said cones, means connecting together the negative cones of a group, and connecting means for said groups.

3. An electrolytic protective device comprising a tank adapted to contain an insulating fluid, a cover therefor having a circuit terminal, a plurality of groups of nested cones, means for supporting said cones in spaced relationship, each of said groups comprising a pair of negative cones and an intermediate positive filmed cone, the positive cone and the lower negative cone being arranged to contain an electrolyte.

4. An electrolytic protective device comprising a pair of electrolytic units, each unit comprising a first electrode and a second electrode, each in the form of a vessel formed to hold a liquid, an electrolyte contained by each electrode, the first electrode nested within the second electrode to form contact with the electrolyte in the second electrode, both electrodes insulated from direct contact with each other, and a third electrode nested within the first electrode to form contact with the electrolyte in the first electrode but insulated from direct contact with the first electrode, the first electrode being of one polarity and the second and third electrodes being of a different polarity and connected together electrically.

5. An electrolytic protective device comprising a pair of electrolytic units, each unit comprising a first electrode and a second electrode, each in the form of a vessel formed to hold a liquid, an electrolyte contained by each electrode, the first electrode nested within the second electrode to form contact with the electrolyte in the second electrode, both electrodes insulated from direct contact with each other, and a third electrode nested within the first electrode to form contact with the electrolyte in the first electrode but insulated from direct contact with the first electrode, the first electrode being of one polarity and the second and third electrodes being of a different polarity and connected together electrically, said units being connected in series.

6. An electrolytic protective device comprising a series of electrolytic units, each unit comprising a first and a second electrode, each in the form of a vessel formed to hold a liquid, an electrolyte contained by each electrode, the first electrode nested within the second electrode, to form contact with the electrolyte in the second electrode, both electrodes insulated from direct contact with each other, and a third electrode nested within the first electrode to form contact with the electrolyte in the first electrode, directly connected with the second electrode and insulated from direct contact with the first electrode, some of said units connected in series and some in multiple.

7. An electrolytic cell comprising electrode elements in the form of electrolyte containers, said electrodes being divided into groups, each group comprising three electrodes, each group forming a unit nest with electrolytic fluid betwen the electrodes, said fluid serving as a connecting link between the middle electrode of the nest and the other two electrodes of the nest, the nests being arranged in groups, each group comprising two nests, the nests in each group being connected in series, the two outer electrodes in one nest being connected with the inner electrode of the other nest of the same group, all of the groups of nests being connected in multiple, the outer electrodes of each nest being of the same polarity and being metallically connected.

8. An electrolytic cell comprising electrode elements in the form of electrolyte containers, said electrodes being divided into groups, each group comprising three electrodes, each group forming a unit nest with electrolytic fluid betwen the electrodes, said fluid serving as a connecting link between the middle electrode of the nest and the other two electrodes of the nest, the nests being arranged in groups, each group comprising two nests, the nests in each group being connected in series, the two outer electrodes in one nest being connected with the inner electrode of the other nest of the same group, all of the groups of nests being connected in multiple, the outer electrodes of each nest being of the same polarity and being metallically connected, each nest being separated from the others, the spaces between the nests being filled with a dielectric.

In witness whereof, I have hereunto set my hand this 7th day of Nov., 1924.

HOWARD G. BRINTON.